(No Model.)

E. E. CROOK.
TEA OR COFFEE POT.

No. 600,139. Patented Mar. 8, 1898.

Witnesses
Carl Schlegel
L. A. Minturn

Inventor
Edwin E. Crook,
By Joseph A. Minturn
Attorney.

UNITED STATES PATENT OFFICE.

EDWIN E. CROOK, OF INDIANAPOLIS, INDIANA.

TEA OR COFFEE POT.

SPECIFICATION forming part of Letters Patent No. 600,139, dated March 8, 1898.

Application filed November 6, 1897. Serial No. 657,667. (No model.)

*To all whom it may concern:*

Be it known that I, EDWIN E. CROOK, a citizen of the United States, residing at Indianapolis, in the county of Marion and State of Indiana, have invented certain new and useful Improvements in Tea or Coffee Pots, of which the following is a specification.

My invention relates to improvements in tea or coffee pots; and the object of my invention is to provide means whereby the pot can be first closed to prevent the admission of cold air until the coffee or tea comes to a boil and then opened to admit cold air for the purpose of condensing the steam and vapor and preventing the escape of the aroma.

Figures 1, 2, 3:
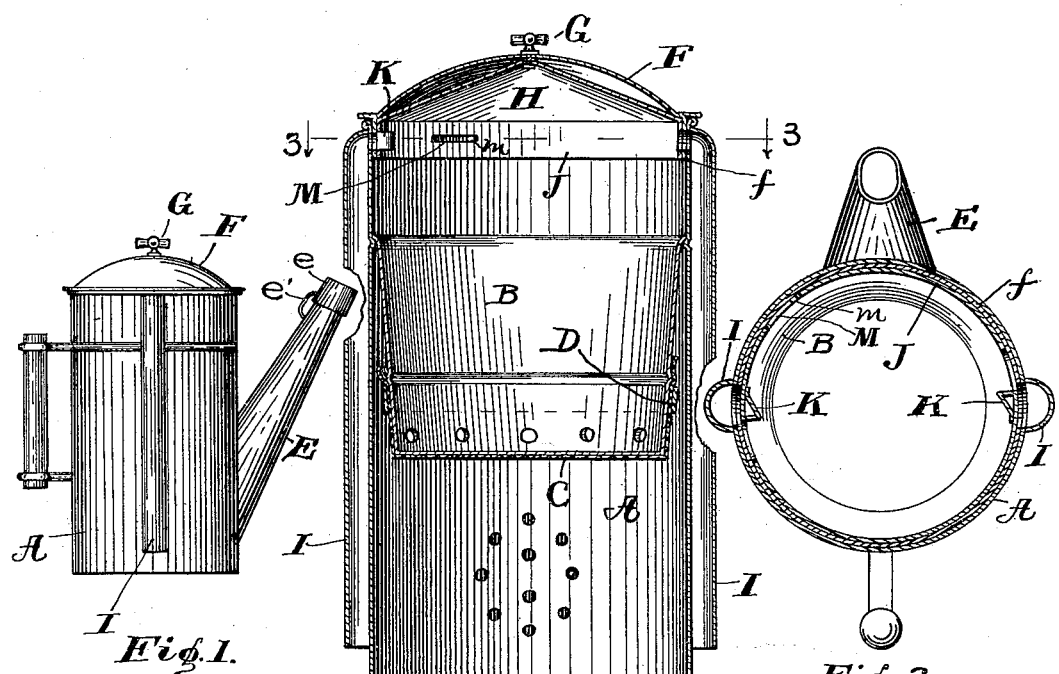

Figure 1 is a view in side elevation of a pot made in accordance with my invention; Fig. 2, a vertical section of Fig. 1 on an enlarged scale; Fig. 3, a horizontal section on the line 3 3 of Fig. 2, and Fig. 4 a vertical section of a modified construction of pot.

Similar letters of reference indicate like parts throughout the several views of the drawings.

A represents a tea or coffee pot of any desired shape or size, and B is the vessel in which the ground coffee or tea-leaves are placed. The bottom and sides of this vessel are perforated, as shown, and over the bottom and sides of this perforated part is placed a cloth C, which acts as a strainer and which cloth is held in position by means of the ring D. Where the vessel is used in a teapot, the straining-cloth will be much finer than in one which is used in a coffee-pot. The upper edge of the vessel B is turned outward to form a flange, and the side of the pot is correspondingly grooved or indented to form a resting-place for the flange.

E is the spout of the pot, and $e$ a cap whereby the spout can be closed to prevent the escape of the steam therefrom. A wire retaining-guide $e'$ prevents the displacement of the cap.

F is a cover or lid which is hinged to the top of the pot in the usual manner and has the usual depending flange $f$ and a central knob G, the stem of which passes through an opening in the lid and is threaded and secured by a nut on the threaded end of the bolt.

H is a conical disk on the inside of the cover and connected thereto by means of the bolt from the knob G. This knob has rotary adjustment in the opening through the lid F, but is secured to the disk H, whereby by turning the knob the disk can be rotated.

Secured to the outside of the pot on two opposite sides approximately midway between the spout and the handle of the pot are the tubes I, which are open at their lower ends and which communicate through openings with the pot at its top. Openings are provided through the flange of the lid and also through a flange J from the disk H, which fits close to the flange $f$, whereby in certain positions of the disk H and its flange direct outside communication through the tubes I is afforded with the interior of the pot. This outside communication permits cold air to pass into the pot and condense the steam and vapor, thereby preventing the escape of the aroma; but in the first stages of the process of making tea or coffee it is important that the pot be closed as tightly as possible, and I close the openings to the tubes I by turning the disk H far enough to cover the openings with unperforated portions of the flange J, as shown in Fig. 3. In order to cause the disk H to swing around automatically as soon as the steam is being generated rapidly and open up outside communication, I provide the wings K on the sides of the slots toward which the flange J must move to effect the opening and make the construction such that while the opening is closed at times it is never entirely closed. Therefore the escape of the steam through the slight opening when the pressure gets strong will exert sufficient pressure against the wings K to move the flange J and expose a full opening into the tubes I. The wings in practice will be made out of the metal which is removed from the flange J to form the required opening, and the back of the wing will be braced with a diagonal brace which serves to reduce the back pressure on the wing. The movement of the flange within prescribed limits will be determined by the slot M, into which a stud-pin $m$ from the lid-flange $f$ will be projected.

Figure 4:
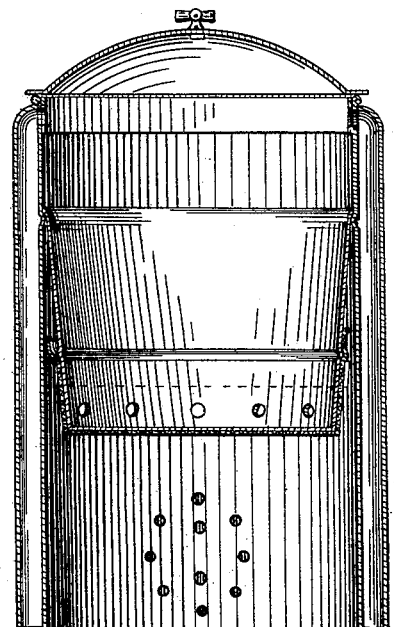

In the modification shown in Fig. 4 the lid is not hinged, which permits the lid itself to be turned to open or close communication with the side tubes. The flanged disk is therefore dispensed with.

Having thus fully described my invention, what I claim as new, and wish to secure by Letters Patent of the United States, is—

1. In combination with a tea or coffee pot, a hinged lid having a flange with perforations, an adjustable flange inside of the flange of the lid having perforations which register at certain adjustments of the flange with the perforations in the lid-flange, and outside tubes which are open to the outer air at their lower ends and communicate at their upper ends with the interior chamber through the openings in the flange of the lid, all substantially as described and for the purposes specified.

2. The combination with a tea or coffee pot A having a handle, a spout E with a cap $e$ working on the guide $e'$, the tubes I open at their lower ends to the outer air and to the interior of the chamber at their upper ends, the hinged lid F, having the flange $f$, with perforations registering with the openings to the tubes I, disk H pivotally secured to the top of the lid and having the flange J with openings which can be brought into register with the openings through the flange of the lid and the wings K, all substantially as described and for the purposes specified.

In witness whereof I have hereunto set my hand and seal, at Indianapolis, Indiana, this 22d day of October, A. D. 1897.

EDWIN E. CROOK. [L. S.]

Witnesses:
 CARL SCHLEGEL,
 JOSEPH A. MINTURN.